March 5, 1968 — M. O. ALLEN ET AL — 3,372,255

MAGNETICALLY RESPONSIVE FLUID FLOW SWITCH

Filed Aug. 9, 1965

INVENTORS
MELVIN O. ALLEN
SHELLEY GRAYBILL
BY John H. Widdowson
ATTORNEY

United States Patent Office 3,372,255
Patented Mar. 5, 1968

3,372,255
MAGNETICALLY RESPONSIVE FLUID FLOW SWITCH
Melvin O. Allen, 407 S. Coronado, and Shelley Graybill, 606 Cosmos Ave., both of Elkhart, Kans. 67950
Filed Aug. 9, 1965, Ser. No. 478,336
2 Claims. (Cl. 200—81.9)

This invention relates to new fluid flow means. In a more particular aspect this invention relates to a new fluid flow switch which is magnetically operated, and more particularly to a fluid flow switch which is magnetically actuated by a float impelled by fluid flow into the magnetic field of a magnet attached to an electrical switch.

Devices for relating the flow of a fluid to an electrical circuit are well known and commonly used in ice making machines, electrical household appliances, refineries, steam systems and the like. They are designed to actuate an electrical circuit by a change in flow of fluid. Some of these devices have small orifices and moving parts mounted in the flow of the fluid which can easily be caused to malfunction by any foreign matter in the system. In some devices a magnet is used within the fluid system which tends to collect foreign matter thereon, disabling the movement required for proper functioning of the switch.

One of the principal disadvantages of devices of this sort has been the restriction of the flow of fluid occasioned by the necessity of passing the fluid through small passageways and orifices, thus placing an extra load on the pressure source and reducing the pressure and flow in the circuit below the control device. Many of such devices in the prior art use springs, levers, diaphragms and mechanical outlets which are complex in design and tend to become worn and inaccurate with use.

We have invented a new fluid flow switch that has an inlet means and an outlet means in a housing means. A float means of magnetic responsive material is movably mounted to float freely in the inlet means. The housing means has a cap portion which defines a fluid chamber within the housing that communicates between the inlet and the outlet means. There is an electrical switch means that has magnetic means operably mounted relative thereto and also operable relative to the float means. The float means is mounted operably to actuate the magnetic means. Our fluid flow switch is constructed and adapted to pass fluid into the inlet means wherein the fluid flow drives the float means upwardly towards the cap means. The magnetic means is drawn downwardly toward the cap means thereby activating the switch means. The fluid is passed around the float means and through the fluid chamber means and out through the outlet means.

By our invention we have provided a fluid flow switch which is simple in design, relatively trouble free in operation, and reliable in use over long periods of time. Fluid passes through our invention without restriction and comes in contact with only one movable part around which foreign substances in the fluid can pass freely without effecting the operation of our invention. The movement of the movable part keeps the inlet means and cap means free of lime and other deposits of foreign materials.

Our invention can be used to actuate an electrical circuit for cutting off the flow, if the flow of fluid through it exceeds a predetermined velocity. Conversely it can be utilized to actuate a cut-off means where the fluid flow has been reduced below a predetermined setting. It is thus apparent that our new invention can be readily adapted to many uses both as a safety device and as a device for actuating a related function in a machine in connection with the flow of fluid therein.

It is an object of this invention to provide new fluid flow means.

It is another object of this invention to provide a new fluid flow switch that does not restrict the flow of fluid through same.

Still another object of this invention is to provide a fluid flow switch the operation of which is not effected by the presence of foreign substances in the flowing fluid.

A further object of this invention is to provide a fluid flow switch that is easily adaptable to many uses.

Yet another object of our invention is to provide a new fluid flow switch which is actuated by magnetic means that are mounted outside of the flow area of the fluid.

One more object of our invention is to provide a new fluid flow switch that can control the flow of fluid to a minimum range.

And still another object of our invention is to provide a new fluid flow switch that can control the flow of a fluid within a maximum range.

Yet a further object of our invention is to provide a new safety switch in a fluid flow system.

Another object of our invention is to provide a fluid flow switch not readily subject to adjustment or tinkering after its manufacture.

Still another object is to provide a fluid flow switch easily adapted to varying desired maximum and minimum flows and still resistant to unauthorized tinkering by adjustment after manufacture.

Various other objects, advantages and features of the invention will become apparent to those skilled in the art from reading the disclosure.

Drawings accompany and are a part of this disclosure. These drawings depict preferred specific embodiments of the fluid flow switch of our invention, and it is to be understood that these drawings are not to unduly limit the scope of the invention. In the drawings, FIG. 1 is a view taken in cross section of a preferred specific embodiment of our invention.

Figure 1:
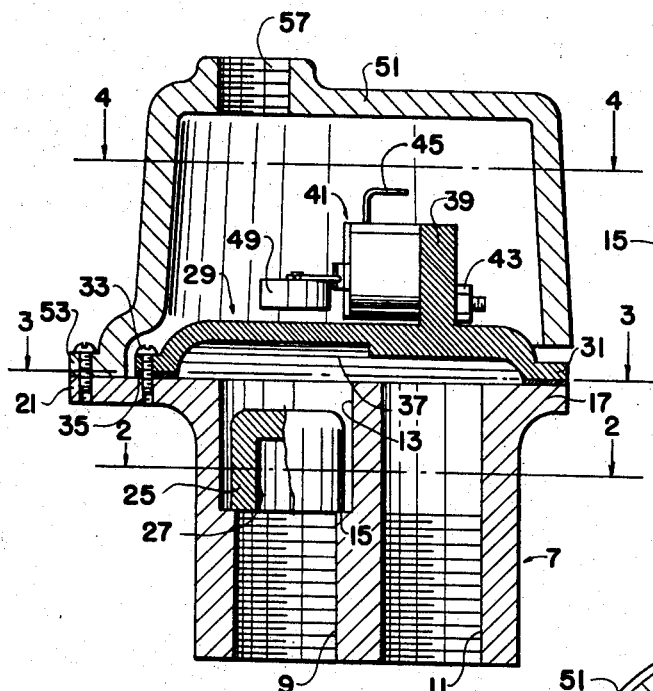
Figure 2:
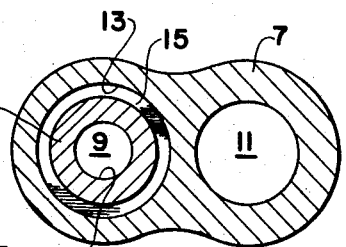
FIG. 2 is a cross section along line 2—2 of FIG. 1.
Figure 4:
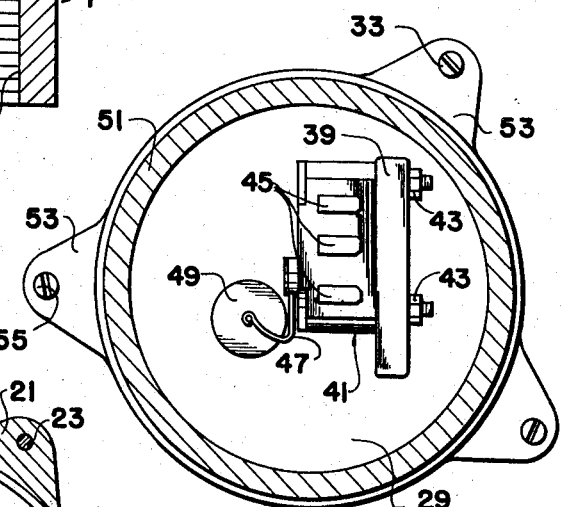
FIG. 4 is a cross section taken along line 4—4 of FIG. 1.
Figure 3:
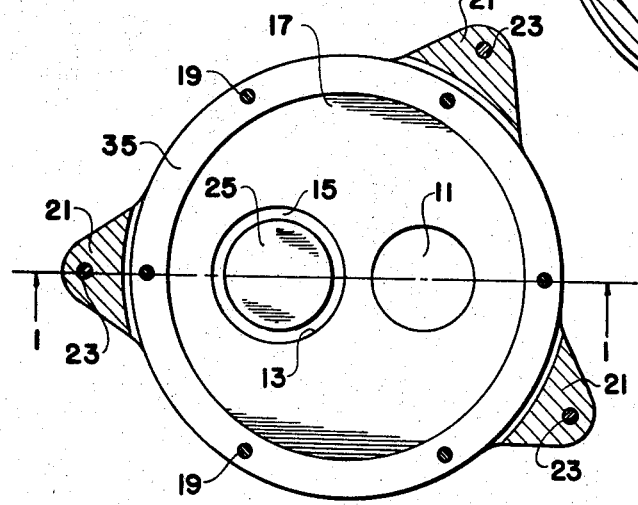
FIG. 3 is a cross section along line 3—3 of FIG. 1.

Referring now to the drawings in detail, on FIG. 1 is shown a housing 7 which is made of a non-magnetic material. This material can be any suitable material such as metal, plastic or the like but preferably of brass and preferably formed by casting. Within the housing are an inlet bore 9 and an outlet bore 11. These bores are preferably drilled in the housing in parallel relationship to each other. The lower portion of each bore is preferably threaded to accommodate pipe fittings (not shown). The inlet bore 9 has a top portion which is drilled out to a larger diameter forming a cylindrical float chamber 13. A shoulder at the bottom of the float chamber 13 forms a float shoulder 15. A generally circular integral flange portion 17 of the housing 7 is on the upper end portion thereof. A plurality of spaced threaded cap mounting holes 19 are preferably drilled around the outside of the flange 17. Three integral mounting tabs 21 project outwardly from the flange portion 17 and have threaded mounting holes 23 therein. This housing 7, of course, can be made in any number of ways other than casting and can be made in several parts with any suitable number of cap mounting holes 19 and cover mounting tabs 21.

A cylindrical float 25 is mounted in the float chamber 13 with the bottom portion thereof engaging the shoulder 15 when the fluid passing into inlet 9 has not reached the predetermined velocity necessary to lift it. This float 25 has a diameter slightly larger than the diameter of the inlet bore 9 but smaller than the diameter of the float chamber 13 and has a specific gravity greater than that of the fluid. The area of the annular space between the outer vertical wall of the float 25 and the inner wall of the float chamber 13 should be preferably as great as the area of the cross section of inlet 9. The float 25 has a blind bore 27 along its axis in the bottom portion thereof. This bore 27 however, can be omitted entirely, filled with a material of higher or lower specific gravity than the magnetic responsive material of the rest of the float, or can be of varying depths and diameters depending on the flow rates and viscosities of the fluids passing into the inlet bore 9 and the maximum and minimum flow rate to which respones is desired. Float 25 can be made of any magnetic responsive material such as iron, steel and the like but preferably of a non-corrosive steel alloy. The float 25 can be made to any suitable size to permit fluid to pass out of the inlet 9, past the shoulder 15 and a around the float 25 substantially unrestricted, and of sufficient length to preclude canting or cocking on walls of float chamber 13 and short enough to permit it to fall free of the magnetic field of magnet 49 when it is at rest on shoulder 15.

A circular domed cap 29 is mounted on the flange portion 17 of the housing 7 by an annular mounting flange portion 31 which has spaced mounting holes 31 therethrough which are coincident with the mounting holes 19 of the housing flange portion 17. Screws 33 secure the cap 29 to the housing 7 through the holes provided, with a fluid tight seal 35 between the cap 29 and the housing 7. This seal 35 can be made of any suitable material such as fiber, cork, plastic or the like but preferably of plastic. The cap is also made of non-magnetic material and can be of any suitable kind such as metal, plastic or the like but preferably of brass and formed by casting. When the cap 29 is so mounted on the housing 7 a fluid chamber 37 is formed between the housing 7 and the cap 29.

A switch mounting bracket is mounted on a top poriton of the cap 29. This bracket 39 can be mounted on the cap by any suitable means but preferably integrally cast therewith. An electrical switch 41 is mounted on the mounting bracket 39 by screw means 43. This switch can be any suitable one of those well known to the art that is easily actuated, but preferably a microswitch type. This switch 41, in the preferred specific embodiment, has means for attaching electrical wiring on the top portion thereof 45, a lever 47 pivotally mounted in the switch 41 and tending to be held in a raised position by weights, springs or the like but preferably by a light spring action (not shown). A magnet 49 is mounted on the projecting end portion of the lever 47. This magnet 49 can be made of any suitable magnetic material and sufficiently magnetized so as to create a magnetic field of sufficient strength that it will be attracted downwardly towards the float 25 when it is in engagement with the bottom portion of the cap 29.

In the preferred embodiment a cup-shaped cover 51 has three mounting flanges 53 around the bottom open end portion thereof which are provided with mounting holes 55 coincidental with the holes 23 in the tabs 21. Screw means 33 are preferably used for mounting the cover 51 on the housing 7 through the holes 55 and 23. An aperture 57 is provided in the top portion of the cover 51 to provide electrical wiring (not shown) to pass through the aperture 57 and operably connect the switch 41 to the electrical means (not shown) by attaching the wiring to the connections 45.

Many uses for this fluid flow switch of our invention are apparent to those skilled in the art. One important application of this switch is in connection with an ice making machine which freezes ice by passing water through a tube until a substantial part of the tube is filled with ice. In this application it is important that the freezing operation be stopped prior to the point where the tube is solidly filled with ice. By use of our invention this cutoff point can be accurately controlled. The water which flows into the tube for freezing is first passed through our invention into the inlet 9, the flow raising the float 25 so that it engages the bottom portion of the cap 29 causing the magnet 49 to be drawn towards the cap and actuating the switch 41 and allowing the water to pass through the fluid chamber 37 and out the outlet bore 11. When the water flow within the ice making machine has been restricted to the point where insufficient flow is passed into the inlet 9, the float 25 falls downwardly in the float chamber 13 and out of the effective magnetic field range of the magnet 49 whereupon the magnet is lifted by the spring means in the switch 41, opening a hot gas solenoid valve by activating solenoid means. Our invention can be used as a safety device in any installation where a fluid flow might be restricted such as in connection with distillation tubes in a petroleum refinery where the tubes are subject to interior restriction by coking and the like. In use our switch can be adapted to set off an alarm when the flow is restricted to a danger point, or stop the firing in the distillation process and the like.

Our invention can also be used where it is desirable to limit the flow of a gaseous or liquid fluid. When it is so utilized, the fluid would be again introduced into the inlet 9, but would not have sufficient flow rate to raise the float 25 so that it comes in contact operably with the magnetic field of the magnet 49. The fluid would then flow as before through the inlet 9, the fluid chamber 37 and out the outlet 11. In the event however that the flow was increased beyond the desired maximum, the float 25 would be urged upwardly, making contact with the magnetic field of the magnet 49 which in turn would be drawn downwardly thus actuating the switch 41 to cut off the fluid flow, actuate an alarm system or the like.

Many other uses of our invention are readily apparent to those skilled in the art. It is easily adaptable to all types of fluids whether liquid or gaseous, and various flow velocities in connection with such fluids. The float 25 can be made heavier or lighter as desired depending on the type of usage. The switch 41 can be wired to any of many possible electrical circuits to close a circuit, open a circuit, or actuate a series of circuits depending on the requirements of the system in which it is installed. Its use as a safety flow switch is of great importance as well as the adaptation to flow control.

The foregoing discussion and description has been made in connection with preferred specific embodiments of the fluid flow switch of our invention. However, it is to be understood that the discussion and description is only intended to illustrate and teach those skilled in the art how to practice the invention, and such is not to unduly limit the scope of the invention which is defined in the claims as set forth hereinafter.

We claim:

1. A fluid flow switch comprising, a housing of non-magnetic material having an inlet bore and an outlet bore through same, the axes of said bores generally parallel to each other, each of said bores having internal threads in one end portion thereof, said inlet bore having a cylindrical float chamber in the other end portion thereof, said chamber having a diameter greater than the diameter of said bores and forming a float shoulder in said inlet bore, a generally circular flange portion of said housing on the other end portion thereof having a flat outer surface perpendicular to the axes of said bores, a plurality of threaded spaced cap mounting holes around the outside portion of said flange and through same, three integral cover mounting tabs around the outside portion of said flange having threaded cover mounting holes therein, a cylindrical float of magnetic responsive material having a diameter smaller than the diameter of said float chamber but greater than the diameter of said inlet bore and having a length less than the length of said float chamber, said float movably mounted in said float chamber with one end portion thereof engageable with said float shoulder, a blind bore in the said end portion of said float engageable with said shoulder, a circular domed cap of non-magnetic material sealingly mounted on said flange portion of said housing, an annular mounting flange portion of said cap having spaced mounting holes therethrough coincidental with said cap mounting holes of said housing, screw means mounting said cap on said housing, a sealing material between said cap and said housing sealing same, said dome portion of said cap forming a fluid chamber between said housing and said cap, a switch mounting bracket on the top outside portion of said cap, an electrical switch means mounted on said bracket, a switch actuating lever mounted on and extending from said switch means, a permanent magnet mounted on the projecting end portion of said lever and immediately above said float chamber, said magnet tending to be held away from said cap by said switch means, a non-magnetic cup-shaped cover having three mounting flanges around the bottom open end portion thereof coincidental with said cover mounting tabs of said housing, said cover mounted on said housing by screw means through said mounting holes, electrical wiring means operably mounted on said switch means and through said cover, said flow switch constructed and adapted to pass fluid into the threaded end portion of said inlet bore, through said float chamber and around said float and into said fluid chamber, out of said chamber and into and out through said outlet bore, the velocity of said fluid flow forcing said float upwards in said float chamber and engaging a bottom portion of said cap immediately below said magnet, said magnet drawn downwardly towards said float engaging the outside top portion of said cap, and moving said lever to actuate said switch until said fluid flow is insufficient to maintain said float in engagement with said cap, and said float falls downwardly away from said cap, whereupon said magnet lifting from said cap by said switch means and said lever activating said switch.

2. A fluid flow switch comprising a housing of non-magnetic material having an inlet bore and an outlet bore through same, said inlet bore having a cylindrical float chamber and a float shoulder therein, one end portion of said housing adjacent said float chamber having a flat flange portion generally perpendicular to the said bores, cap and cover mounting means in said flange portion, a cylindrical float of magnetic responsive material movably mounted in said float chamber, a circular domed cap of non-magnetic material mounted on said flange portion of said housing, forming a fluid chamber between said housing and said cap, electrical switch means mounted on the top outside portion of said cap, a switch actuating lever mounted on and extending from said switch means, a magnet mounted on the projecting end portion of said lever and immediately above said float chamber, said switch means tending to hold said magnet upwardly away from said cap, a cup-shaped cover mounted on said housing flange and covering said switch means, electrical wiring means operably mounted on said switch means and through said cover, said flow switch constructed and adapted to pass fluid into said inlet bore, through said float chamber and around said float and into said fluid chamber, out of said fluid chamber and into said outlet bore, the velocity of the flow of said fluid forcing said float upwardly in said float chamber to engage a bottom portion of said cap immediately below said magnet, said magnet drawn downwardly toward said float when so engaged until said flow velocity is insufficient to maintain said float in engagement with said cap, said float falling downwardly away from said cap, said magnet lifting from said cap by said switch means and said lever activating said switch.

References Cited
UNITED STATES PATENTS 2,791,657    5/1957    Bloxsom ---------- 200—81.9

BERNARD A. GILHEANY, *Primary Examiner.*

H. BROOME, G. MAIER, *Assistant Examiners.*